US012772002B2

(12) United States Patent
Abecassis et al.

(10) Patent No.: US 12,772,002 B2
(45) Date of Patent: Oct. 20, 2026

(54) AUTOMATIC DETECTION OF ALIGNMENT BETWEEN TWO AUDIO SIGNALS

(71) Applicants: Disney Enterprises, Inc., Burbank, CA (US); ETH Zürich (Eidgenössische Technische Hochschule Zürich), Zürich (CH)

(72) Inventors: Eitan Abecassis, Raleigh, NC (US); David Meyer, Zürich (CH); Clara Fernandez Labrador, Zürich (CH); Christopher Richard Schroers, Uster (CH); Scott Labrozzi, Cary, NC (US)

(73) Assignees: Disney Enterprises, Inc., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 167 days.

(21) Appl. No.: 18/776,765

(22) Filed: Jul. 18, 2024

(65) Prior Publication Data

US 2025/0280239 A1 Sep. 4, 2025

Related U.S. Application Data

(60) Provisional application No. 63/560,419, filed on Mar. 1, 2024.

(51) Int. Cl.
*H04R 5/04* (2006.01)
*H04S 7/00* (2006.01)

(52) U.S. Cl.
CPC ............... *H04R 5/04* (2013.01); *H04S 7/301* (2013.01); *H04S 2400/15* (2013.01); *H04S 2420/03* (2013.01)

(58) Field of Classification Search
CPC ....... H04R 5/04; H04S 7/301; H04S 2400/15; H04S 2420/03
(Continued)

(56) References Cited

U.S. PATENT DOCUMENTS 12,505,863 B1 * 12/2025 Gupta .................. G06V 40/161
2013/0162905 A1 6/2013 Matsumoto et al.
(Continued)

FOREIGN PATENT DOCUMENTS

CN 103297805 A 9/2013
CN 110675886 A * 1/2020 ............. G10L 25/03
(Continued)

OTHER PUBLICATIONS

First Office Action, Japanese Patent Application No. 2024-214122, Japan Patent Office, mailed Sep. 30, 2025, 7 pages.
(Continued)

*Primary Examiner* — Norman Yu
(74) *Attorney, Agent, or Firm* — Kwan & Olynick LLP

(57) ABSTRACT

In some embodiments, a method analyzes a first sample of a first audio signal to determine a first representation in a space. A plurality of second samples for a second audio signal is analyzed to determine a plurality of second representations in the space. The method compares the first representation and the plurality of second representations in the space to select a second representation. An offset is determined between the first sample and a second sample that is associated with the second representation. The offset is output.

20 Claims, 6 Drawing Sheets

(58) Field of Classification Search
USPC .................................... 381/17; 704/208, 278
See application file for complete search history.

(56) References Cited

U.S. PATENT DOCUMENTS

| | | | |
|---|---|---|---|
| 2017/0180906 A1* | 6/2017 | Chebiyyam ............... | H04S 1/00 |
| 2021/0051404 A1 | 2/2021 | Li et al. | |
| 2021/0132895 A1* | 5/2021 | Cengarle ................. | G10L 25/06 |
| 2022/0060531 A1 | 2/2022 | Liang et al. | |
| 2025/0126424 A1 | 4/2025 | Moriya et al. | |

FOREIGN PATENT DOCUMENTS

| | | | |
|---|---|---|---|
| CN | 117859174 | A | 4/2024 |
| JP | 2003167596 | A | 6/2003 |
| JP | 2008522243 | A | 6/2008 |
| JP | 2013135310 | A | 7/2013 |
| JP | 2021500778 | A | 1/2021 |
| KR | 1020070086849 | A | 8/2007 |
| WO | 2005106850 | A1 | 11/2005 |
| WO | 2006060278 | A1 | 6/2006 |
| WO | 2023032065 | A1 | 3/2023 |

OTHER PUBLICATIONS

Extended European Search Report, EP Patent Application No. 24217425.8, Feb. 3, 2025, 9 pages.
"Relative Timing of Sound and Vision for Broadcasting", Rec. ITU-R BT. 1359-1, 1998, 3 pages.
Akash Gupta et al., "Modeformer: Modality-Preserving Embedding for Audio-Video Synchronization Using Transformers", New York University, Amazon Studios, Mar. 21, 2023, 5 pages.
Alp Oktem et al., "Bilingual Prosodic Dataset Compilation for Spoken Language Translation", Universitat Pompeu Fabra, Nov. 21, 2018, 5 pages.
Ashish Vaswani et al., "Attention Is All You Need", Aug. 2, 2023, 15 pages.
Avijit Vajpayee et al., "A Simple and Efficient method for Dubbed Audio Sync Detection using Compressive Sensing", Amazon Science, Jan. 2003, 8 pages.
Camillo Lugaresi et al., "MediaPipe: A Framework for Building Perception Pipelines", Jun. 14, 2019, 9 pages.
Joanna Brunder et al., "Acoustic resolution photoacoustic Doppler velocimetry in blood-mimicking fluids", Scientific Reports, Mar. 31, 2015, 28 pages.
John Christopher Murray et al., "Robotic Sound-Source Localization and Tracking Using Interaural Time Difference and Cross-Correlation", University of Sunderland, May 22, 2014, 9 pages.
Joon Son Chung et al., "Out of Time: Automated Lip Sync in the Wild", Conference paper in Computer Vision—ACCV 2016 Workshops, Mar. 16, 2017, 14 pages.
Kevin Cai et al., "ANIM-400K: a Large-Scale Dataset for Automated End to End Dubbing of Video", University of California, Jan. 10, 2024, 5 pages.
Marcello Federico et al., "Evaluating and Optimizing Prosodic Alignment for Automatic Dubbing", Amazon, Oct. 25-29, 2020, 5 pages.
Nicolas Staelens et al., "Assessing the importance of audio/video synchronization for simultaneous translation of video sequences", Article in 'Multimedia Systems', vol. 18, No. 6, Sep. 19, 2011, 16 pages.
Romain Hennequin et al., "SPLEETER: a Fast and State-of-the Art Music Source Separation Tool With Pre-Trained Models", ISMIR 2019, Jun. 2020, 2 pages.
Sofía Sánchez-Mompeán, "Netflix likes it dubbed: Taking on the challenge of dubbing into English", University of Murcia, Jul. 30, 2021, 11 pages.
Soo-Whan Chung et al., "Perfect Match; Improved Cross-Modal Embeddings for Audio-Visual Synchronisation", Yonsei University, Seoul, South Korea, Nov. 2, 2018, 5 pages.
Venkatesh S. Kadandale et al., "VocaLIST: An Audio-Visual Synchronisation Model for Lips and Voices", Universitat Pompeu Fabra, Spain, Jun. 30, 2022, 5 pages.
Office Action, Japanese Patent Application No. 2024-214122, Japan Patent Office, mailed Feb. 17, 2026, 4 pages.

* cited by examiner

AUTOMATIC DETECTION OF ALIGNMENT BETWEEN TWO AUDIO SIGNALS

CROSS REFERENCE TO RELATED APPLICATIONS

Pursuant to 35 U.S.C. § 119 (e), this application is entitled to and claims the benefit of the filing date of U.S. Provisional App. No. 63/560,419 filed Mar. 1, 2024, entitled "Automatic Detection of Alignment Between Two Audio Signals", the content of which is incorporated herein by reference in its entirety for all purposes.

BACKGROUND

Audio quality control is largely a manual process for a company. Audio errors can occur in a variety of places in a content pipeline starting from content mastering and extending all the way to content distribution. The misalignment between audio and video is one of the most distracting quality defects in media consumption today. Even a slight offset in the audio and video may be noticeable to a viewer. In the film industry, audio and video synchronization issues may be key drivers to viewer disengagement. While media synchronization issues happen for a myriad of reasons, one area that is more susceptible to these errors is dubbing. In some examples, the visual component of the dubbed media is unchanged, but the audio track is replaced with a translated rendition of the original language. Producing and inserting the new audio track may result in a de-synchronization with the original audio track. As dubbed content consistently grows in popularity, the problem of unidentified synchronization errors becomes increasingly prevalent.

The quality control of dubbed media may mostly be a manual process. The quality checks may include users who are specialized in listening for differences in the audio or quality control operators visually comparing raw waveforms for any errors. These subjective evaluations may be costly, inefficient, and also not able to detect small isolated errors.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
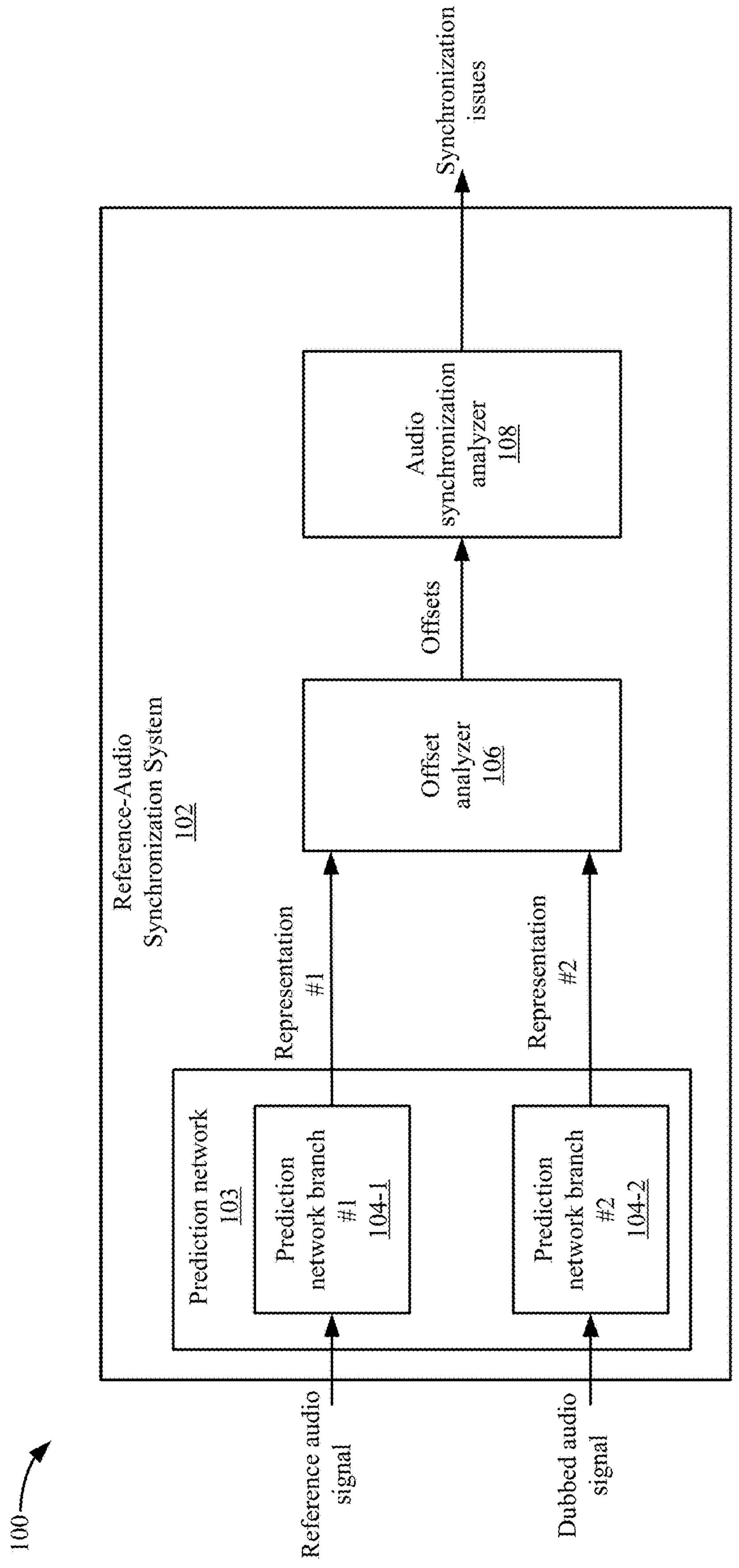
FIG. 1 depicts a simplified system for analyzing audio signals according to some embodiments.

Described herein are techniques for an audio signal analysis system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

A system receives two audio signals for comparison. The audio signals may be different types of audio signals, such as, but not limited to, mono, stereo (2.0), surround (e.g., 5.1, 7.1), etc. A reference audio signal may be a first audio signal in a first language, such as an original language of the video. A target audio signal may be a second audio signal that may be related to the reference audio signal. For example, the target audio signal may be a dubbed audio signal in an arbitrary language, such as a foreign language translated from the original language. The target audio signal may also be an encoded version of the reference audio signal, a narration track (a description mixed with the reference audio signal), or any other derivative audio signal from the reference audio signal. The system compares the two audio signals to determine offsets between the signals. For a video, there may be multiple dubbed audio signals in multiple foreign languages. The system may perform the following analysis between the reference audio signal and each dubbed audio signal. Each reference audio signal and dubbed audio signal pair may have different offset issues that may be detected.

In some embodiments, a prediction network includes two branches that extract features from the two audio signals. For example, a first branch extracts features from the reference audio signal, and a second branch extracts features from the dubbed audio signal. Each branch receives samples of the respective audio signal corresponding to a time period. The time period may be the same time period, such as samples of raw audio from timestamps a to b, where b is larger than a by t seconds(s), or from different time periods. Each branch outputs a representation in a higher dimension space of the respective samples. The system compares the output for the two audio signals to determine a temporal offset between the two audio signals. Different methods may be used to determine the offset, which will be described below. Offset issues can be determined based on analyzing multiple samples throughout the entirety of the two audio signals. For example, an offset is calculated first for timestamp 0 s-10 s, then 10 s-20 s, and so on. Although certain time periods are used in the present description, such as 10 seconds, 200 milliseconds, 20, milliseconds, etc., these time periods are just examples and other time periods may be used. This allows for a more detailed view of the types of offsets that may be present in a reference audio signal and the target audio signal. The system determines the offset between audio signals and may use that offset to adjust the dubbed audio signal to address the synchronization issues.

The system may be trained to recognize multiple issues that may occur in the dubbing process. For example, the system may be able to recognize global offsets, which can be further grouped into constant offsets and drift offsets, and intermittent offsets, which are isolated/one-off offsets during a portion of the audio signal (e.g., silence, uncorrelated audio from an entirely different audio file, or a temporary shift). A global offset may be an offset that occurs throughout the video. A constant offset is constant throughout the video. The drift offset may drift throughout the video in a direction. Intermittent offsets may be isolated offsets that may occur in isolated portions of the video. Speech issues may occur in sequences containing only dialogue compared to portions of audio that only contain background cues.

Some use cases where the quality control analysis can be used include:

Dubbing: the two audio tracks may inherently be different during speech segments, and can even differ in background noise (e.g., background laughter in sitcoms) and music.

Encoding: For linear television (TV), common audio manipulation between the input and output audio tracks includes noise reduction, loudness mitigation/normalization/amplification, filtering, and compression.

Dialog mismatch: lines of dialog can be added or removed from the "dubbing reference" provided to third parties compared to the final original audio. This poses a challenge for foreign dubbing/subbing teams, as the dubbing they create might not reflect the dialogue present in the final version.

Narration track: when description is added over a main audio track. The target audio track may be out of sync with the added description.

System

FIG. 1 depicts a simplified system 100 for analyzing audio signals according to some embodiments. A reference audio synchronization system 102 (synchronization system 102) receives a reference audio signal and a target audio signal. The audio signals may be associated with a timeline in the video, such as two hour video may have a two hour audio signal. As discussed above, the reference audio signal may be a first signal that is in a first language (e.g., the original language of the audio track). The target audio signal may be in a different language from the original language, such as a foreign language that is translated from the original language. In some examples, the original language may have been English and the dubbed languages may be Spanish, French, etc. Although an original language is described, the reference audio signal may be languages other than the original language. Also, the two audio signals do not have to be in different languages, and can be the same language. For example, two audio signals may have different background music or sounds.

Synchronization system 102 may include a prediction network 103 that analyzes the reference audio signal and the target audio signal to generate a first representation #1 of the reference audio signal and a second representation #2 of the target audio signal. The representations may extract important features of the respective audio signal in a higher dimension space. The representations may be embeddings of the respective audio signal.

Different prediction networks may be used. Prediction network 103 includes a prediction network branch #1 104-1 and a prediction network branch #2 104-2. Although this structure of prediction network 103 is described, other structures that can determine representations for audio signals may be used. In some embodiments, each prediction network branch may be based on a transformer architecture that can extract features from an audio signal to generate a representation of the audio signal. In some embodiments, prediction network branch #1 104-1 analyzes the reference audio signal to output a representation #1 and prediction network branch #2 104-2 analyzes the target audio signal to output a representation #2. In some embodiments, the logic of prediction branch #1 104-1 and the logic of prediction network branch #2 104-2 may form a Siamese network, transformer-based twin network, or other network, in which the logic of both branches are similar. The values of parameters of prediction branch #1 104-1 and the parameters of prediction network branch #2 104-2 may be adjusted based on a training process as described below.

In some embodiments, prediction network branch #1 104-1 and prediction network branch #2 104-2 analyze sequences of the reference audio signal and the target audio signal, respectively. Both signals may be segmented into shorter sequences (e.g., ten seconds) in the video to gather multiple predictions along the signal. The sequence may include multiple samples. Each sample may be a window of a time range of the respective audio signal. The input into prediction network branch #1 104-1 and prediction network branch #2 104-2 may be windows, such as 200 milliseconds (ms). Representation #1 and representation #2 may include one or more representations for a single sequence, such as 200 ms sliding window with sliding increments of 20 ms are generated for a 10 second sequence, and input into prediction network branch #1 104-1 and prediction network branch #2 104-2. The use of short samples allows the system to account for issues that happen globally, such as constant offsets, in addition to intermittent offsets, such as drifts or isolated offsets, which can be found in dubbing. The prediction for the sequence may be determined based on the analysis of the offsets in the samples.

An offset analyzer 106 may analyze representation #1 and representation #2 to predict offsets between the two representations. The offset may be a time, such as t milliseconds between samples of representation #1 and representation #2. As will be described in more detail below, offset analyzer 106 may predict offsets using different methods. For example, offset analyzer 106 may select a first representation #1 for a first sample. Then, offset analyzer 106 compares the distance between the first representation #1 to second representations #2 for second samples around time of the first sample. Offset analyzer 106 selects a second representation #2 based on the distance (e.g., the representation that is closest in distance). As these two samples are considered similar, offset analyzer 106 determines the offset between the first sample and the second sample in the timeline of the video, such as the offset may be 20 ms. Each pair of the representations correspond to a period of time in the media timeline. Then, offset analyzer 106 may output offsets for each sample of the reference audio signal.

Audio synchronization analyzer 108 may analyze offsets for the samples to determine if the video and dubbed audio have any synchronization issues. As described above, audio synchronization analyzer 108 may be able to detect multiple synchronization issues that may occur in the target audio signal. The different types of synchronization issues will be described in more detail below.

Training

Figure 2:
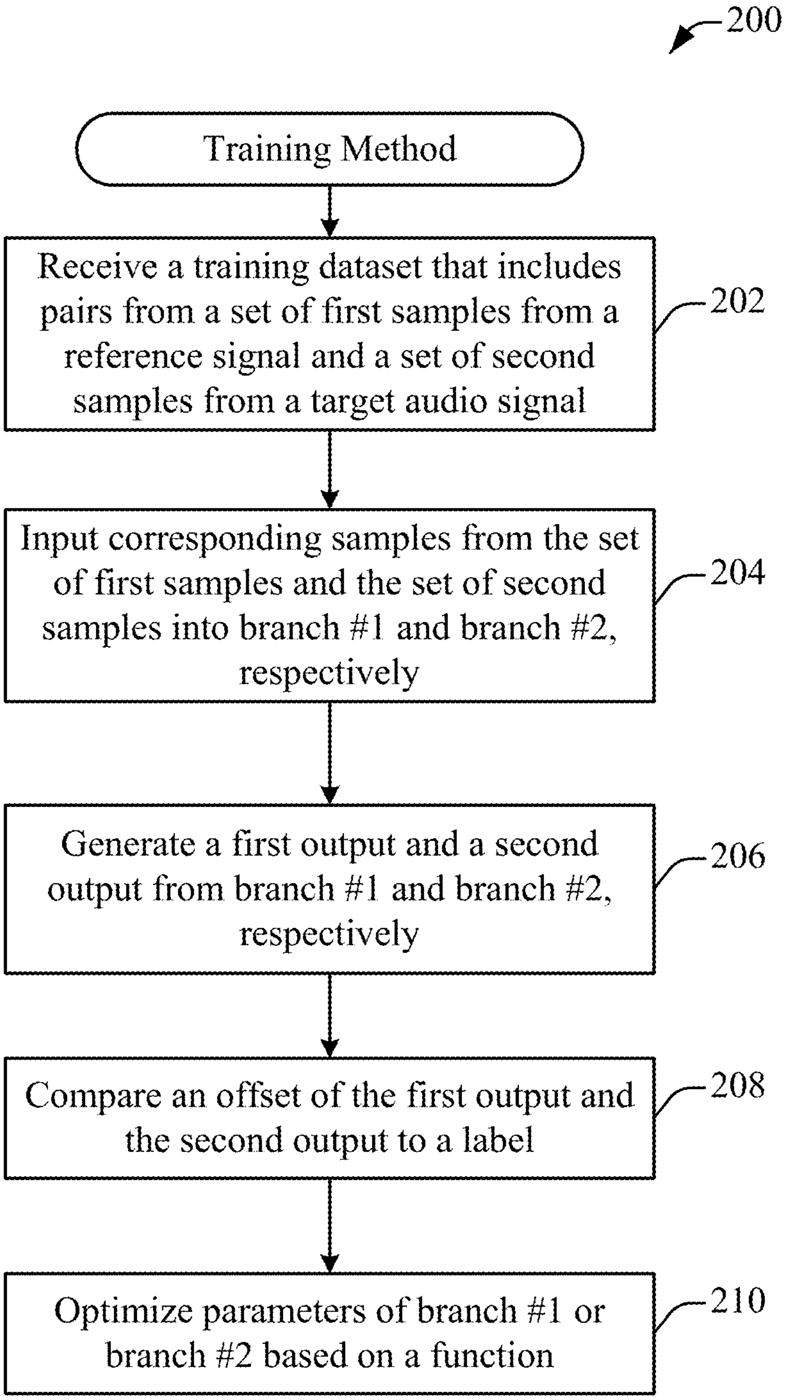
FIG. 2 depicts a simplified flowchart of a method for training a prediction network according to some embodiments.

Prediction network 103 may be trained using different methods. FIG. 2 depicts a simplified flowchart 200 of a method for training prediction network 103 according to some embodiments. At 202, synchronization system 102 receives a training dataset that includes pairs from a set of first samples from a reference signal and a set of second samples from a target audio signal. Also, a label for the pairs may be provided. For example, a label may indicate whether the samples are in sync or out of sync, or the label may list the offset between the samples. In some embodiments, a contrastive learning process may be used to discriminate between in-sync samples and out-of-sync samples. In-sync samples may be labeled where the offset between the reference sample and the dubbed sample is below a threshold, such as an offset that is not noticeable to humans. For example, a range in which some humans may not be able detect whether the signals are misaligned may be [−125,45]

ms, but other ranges may be used. Out-of-sync samples may be labeled where the offset between the reference signal and the dubbed sample is above a threshold, such as the offset is noticeable to humans. The in sync and out of sync samples may be generated in different ways. In some embodiments, the out of sync samples are generated by assuming that all audio pairs are originally synchronized and out of sync samples are generated by artificially advancing or delaying the target audio signal with respect to the reference audio signal. Portions of the data may be verified to be in sync also. The training dataset may include multiple synchronization issues that may occur (e.g., uncorrelated samples, silence, etc.). Augmentations may be added as potential audio differences that are found in the dubbed audio signal. In some embodiments, the augmentations may include mixing with background laughter, the addition of Gaussian noise, random loudness gain, high pass filtering, low pass filtering, polarity inversion, and pitch shift, but other augmentations may be used. Training the prediction network with the above data augmentations improves the robustness of predictions between the reference audio signal and variations of the dubbed audio signal that might occur in production use cases.

At 204, synchronization system 102 inputs corresponding samples from the first set of samples and the second set of samples into branch #1, 104-1 and branch #2 104-2, respectively. For example, for a first pair, a first sample and a second sample are input into branch #1 and branch #2, respectively. Successive pairs are input into branch #1 and branch #2, respectively.

At 206, a first output is generated from branch #1 and a second output is generated from branch #2. The first output may be a representation #1 for the first sample, and the second output may be a representation #2 for the second sample. The representations may be in a higher dimensional space and contain important features of the respective samples.

At 208, offset analyzer 106 may compare a difference of the first output and the second output to a label. For example, the label may be in sync or out of sync. Also, the label may be an offset between the first sample and the second sample. For example, if the label is in-sync, synchronization system 102 may train the prediction network 103 to output representations that are closer in distance in the higher dimension space. If the label is out of sync, synchronization system 102 may train the prediction network 103 to output representations that are further in distance in the higher dimension space. Pairs from multiple different offset issues may be used to train prediction network 103. This trains prediction network 103 to be robust in detecting offsets for different issues.

At 210, synchronization system 102 may optimize the parameters of branch #1 or branch #2 based on a function, such as a loss function. In some embodiments, the parameters are adjusted using a contrastive loss by minimizing a distance between in sync samples and maximizing the distance between out of sync samples. The above process may be performed for all the pairs of samples.

After training, prediction network 103 may be used to generate representations that are used to determine offset predictions.

Offset Prediction

Figure 3:
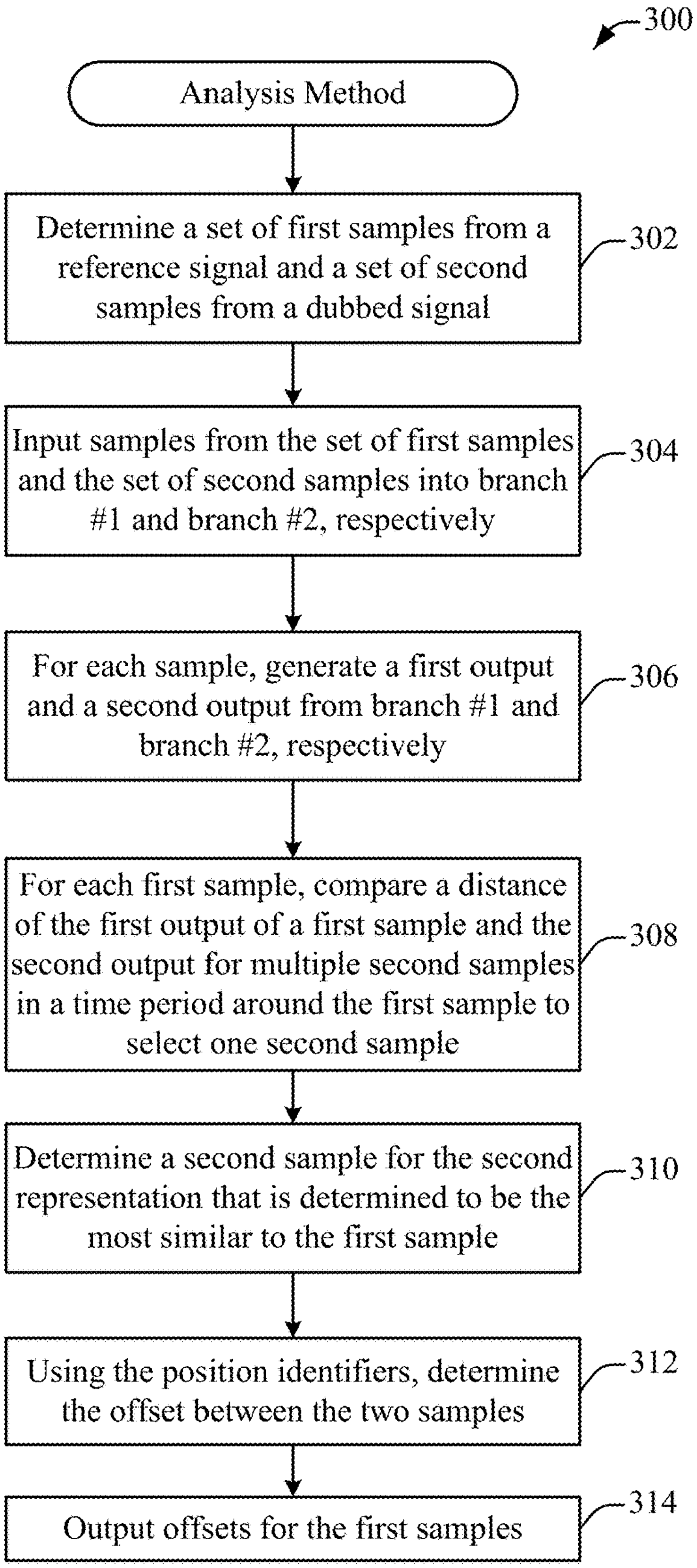
FIG. 3 depicts a simplified flowchart for predicting offsets according to some embodiments.

FIG. 3 depicts a simplified flowchart 300 for generating offsets according to some embodiments. At 302, prediction network 103 determines a set of first samples from a reference signal sequence (e.g., a sequence of 10 seconds) and a set of second samples from a target audio signal sequence (e.g., a sequence of 10 seconds). The first samples and the second samples may be a sequential set of windows of t milliseconds in duration, such as each sample may be 200 milliseconds, but other windows of time may be used. Each window may be identified by a position indicator in the sequence, such as a timestamp of a video. For example, the samples may be labeled by a time range, such as 0-200 ms, 10-210 ms, 20-220 ms, etc. Sequences of 10 seconds may be analyzed throughout the reference signal and the target audio signal.

At 304, synchronization system 102 inputs the respective samples from the first set of samples and the second set of samples into branch #1 and branch #2. Branch #1 104-1 may generate representations of the first set of samples independently of branch #2 104-2 generating representations of the second set of samples. This is because the outputs may be analyzed after the representations are generated. At 306, for each sample, a first output is generated from branch #1 104-1 and a second output is generated from branch #2 104-2. The output of branch #1 104-1 is a sequence of representations for the first set of samples and the output of branch #2 104-2 is a sequence of representations for the second set of samples. The representations may be identified, such as by the position identifiers, and will be analyzed by offset analyzer 106.

Offset analyzer 106 may generate the offset using different processes. In some embodiments, at 308, offset analyzer 106 may compare a first representation for a first sample to multiple second representations from second samples within a time range, such as plus or minus t seconds. The offset of the first sample may be based on analyzing the differences between first representations for the first sample and multiple second representations for second samples in the range. In some embodiments, offset analyzer 106 determines a second representation in the range that is closest in distance to the first representation. Then, at 310, offset analyzer 106 determines a second sample for the second representation that is determined to be the most similar to the first sample for the first representation based on a closet distance between the two samples. At 312, using the position identifiers for the samples, offset analyzer determines the offset between the two samples. For example, the second sample may be −10 ms from the first sample based on comparing the times associated with the position indicators. An example of calculating the offset will be described in FIG. 4. The offset may be determined for all the first samples. At 314, offset analyzer 106 outputs the offsets for the first samples.

Figure 4:
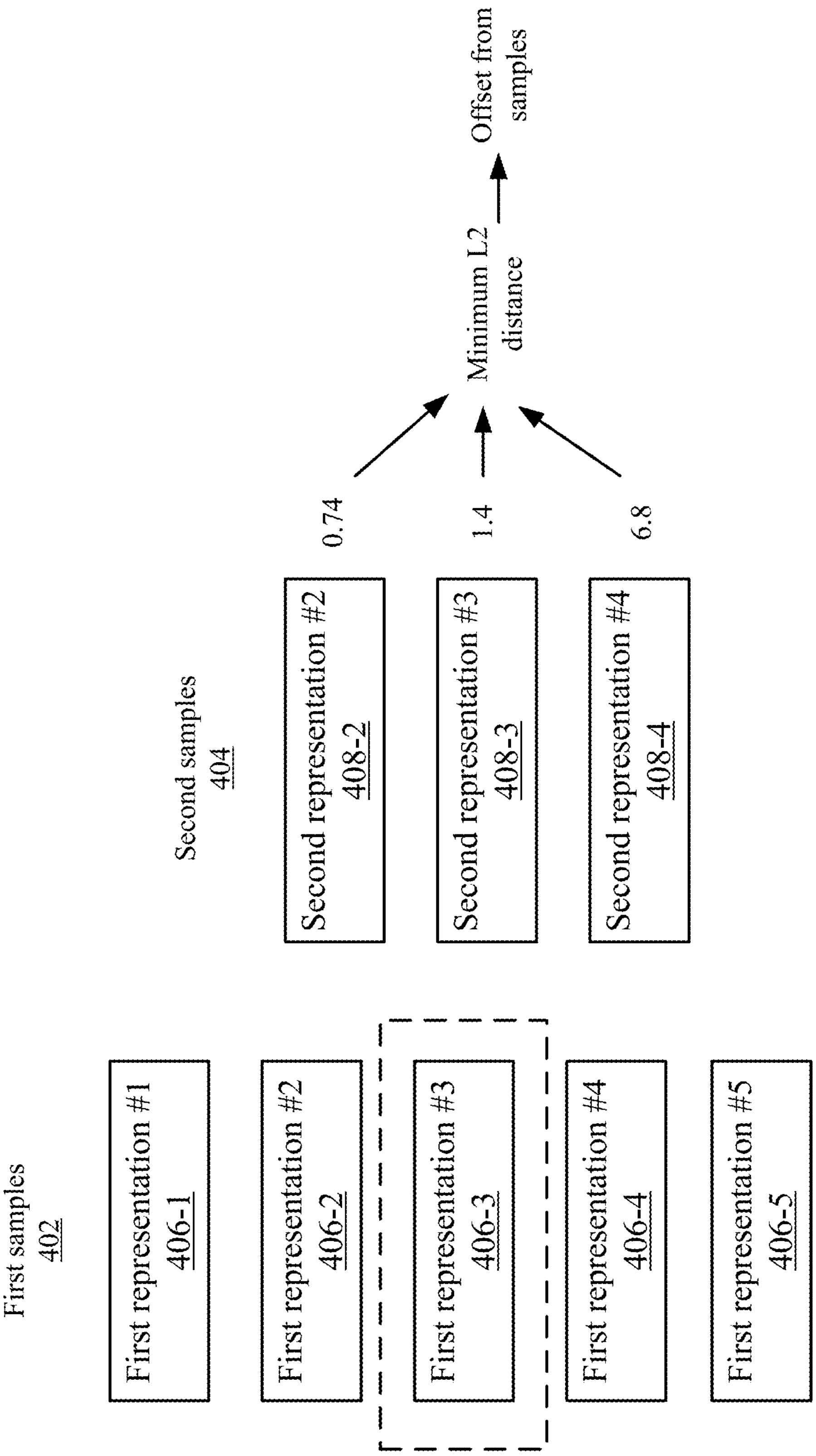
FIG. 4 depicts an example of the offset analysis process according to some embodiments.

FIG. 4 depicts an example of the offset analysis process according to some embodiments. The following may be performed for each sequence (e.g., 10 seconds) for the reference signal and the target audio signal. First representations #1 to #5 406-1 to 406-5 for first samples 402 and second representations #2 to #4 408-2 to 408-4 for second samples 404 are shown. First representations 406-1 to 406-5 are associated with five sequential first samples included in the reference audio signal and second representations 408-2 to 406-4 are associated with three sequential second samples included in the target audio signal in a time range. Other representations may exist for an audio, but are not shown, such as second representations for a sample before second representation #2 408-2 and after second representation #4 408-4 are not shown. Each representation may be a sequential set of windows of 200 ms in duration using a hop size of 10 ms (e.g., 0 ms-200 ms, 10 ms-210 ms, 20 ms-220 ms, . . . , 9800 ms-10000 ms). For each of these windows, prediction network 103 generates an embedding representation (e.g., an embedding representing time 0 ms-200 ms, an embedding representing 10 ms-210 ms, etc.).

In the offset generation, offset analyzer 106 may select instances of first representations 406, and then calculate the offset for each instance. In this example, first representation #3 406-3 may be selected by offset analyzer 106, but a similar calculation is performed for first representation #1, #2, #4, #5, etc.

In the process, offset analyzer 106 computes a range in which to select second representations 408. The range may be plus or minus t seconds. For example, offset analyzer 106 selects second representations from samples around the time associated with the first sample #3, which is associated with first representation #3 406-3. In the example, the embedding 406-3 (e.g., representation of the reference audio window 20 ms-220 ms) has the same timestamp as embedding of 408-3 (e.g., the representation of the target audio window of 20 ms-220 ms). In some embodiments, offset analyzer 106 selects second representation #2 408-2, second representation #3 408-3, and second representation #4 408-4, but other representations may be selected. Offset analyzer 106 computes distances between first representation #3 406-3 and second representation #2 408-2, second representation #3 408-3, and second representation #4 408-4, respectively. The distance may be the L2 distance between the values of the representations in the higher dimensional space. Offset analyzer 106 determines which of second representations 408-2, 408-3, 408-4 is closest to first representation 406-3.

Offset analyzer 106 determines that first representation 406-3 is most similar to second representation 408-2, as that is the minimum distance computed (e.g., 0.74). Because first representation 406-3 and second representation 408-2 are representations of different time intervals, offset analyzer 106 determines that there is an offset (e.g., in this case 10 ms as they are neighboring samples). If the minimum distance were to be between correspondent representations (e.g., first representation 406-3 and second representation 408-3), then the two samples would be considered in sync.

The above process is repeated for every representation in first samples 402. That is, each representation of first samples 402 have a corresponding second sample (offset). First samples 402 are the representations generated for just the first sequence (e.g., 0 s-10 s). The offset is determined for every representation/sample (e.g., 200 ms window) of this sequence, which results in multiple offset predictions for the sequence (e.g., 0 s-10 s). In some embodiments, offset analyzer 106 uses these predictions to determine one offset for the segment 0-10 s by taking the median of all offsets predicted for first samples 402. This process is repeated for every sequence of the reference signal (e.g., 0 s-10 s, 10 s-20 s, 20 s-30 s . . . Ns–N+10 s). Other methods to determine the offset for the sequences may also be used, such as using the average of the offsets.

In an example, offset analyzer 106 computes the distance of each second representation #2, #3, and #4 to first representation #3 406-3. This results in distances of 0.74, 1.4, and 6.8, respectively, for second representations #2, #3, and #4. Offset analyzer 106 selects which second representation is most similar to first representation #3 406-3 (e.g., the minimum distance). If 0.74 is the minimum distance between second representation #2 408-2 and first representation #3 406-3, this means that these two representations are the most similar in this range. The offset between second representation #2 408-2 and first representation #3 406-3 is then determined. For example, a second sample #2 associated with second representation #2 408-2 may be −10 ms in the timeline from a first sample #3 associated with first representation #3 406-3. The offset of −10 ms is then determined. Although this method may be used to determine offsets, other methods may be used.

Accordingly, the distance in the higher dimensional space is used to determine pairs of samples in the timeline. The offset is determined from the samples. The use of distance in the higher dimensional space allows prediction network 103 to be trained to generate representations based on multiple different issues. This allows offsets to be detected from the different issues.

Synchronization Issue Types

Synchronization system 102 can detect different types of issues with target audio signals. For example, audio synchronization analyzer 108 may detect global offsets, intermittent offsets, etc.

Constant offsets may be a constant offset that exists throughout the entire video. In some embodiments, audio synchronization analyzer 108 provides an offset prediction for consecutive samples of the reference signal and the target audio signal, such as in 10 second sequences. The offset predictions may be analyzed over all sequences to provide a global prediction. In some embodiments, predictions with a confidence value greater than a threshold that may be considered for the global offset prediction. Audio synchronization analyzer 108 uses these sequences to calculate the global offset prediction. Audio synchronization analyzer 108 may accurately predict a global offset using the offset prediction for the sequences.

Figure 5:
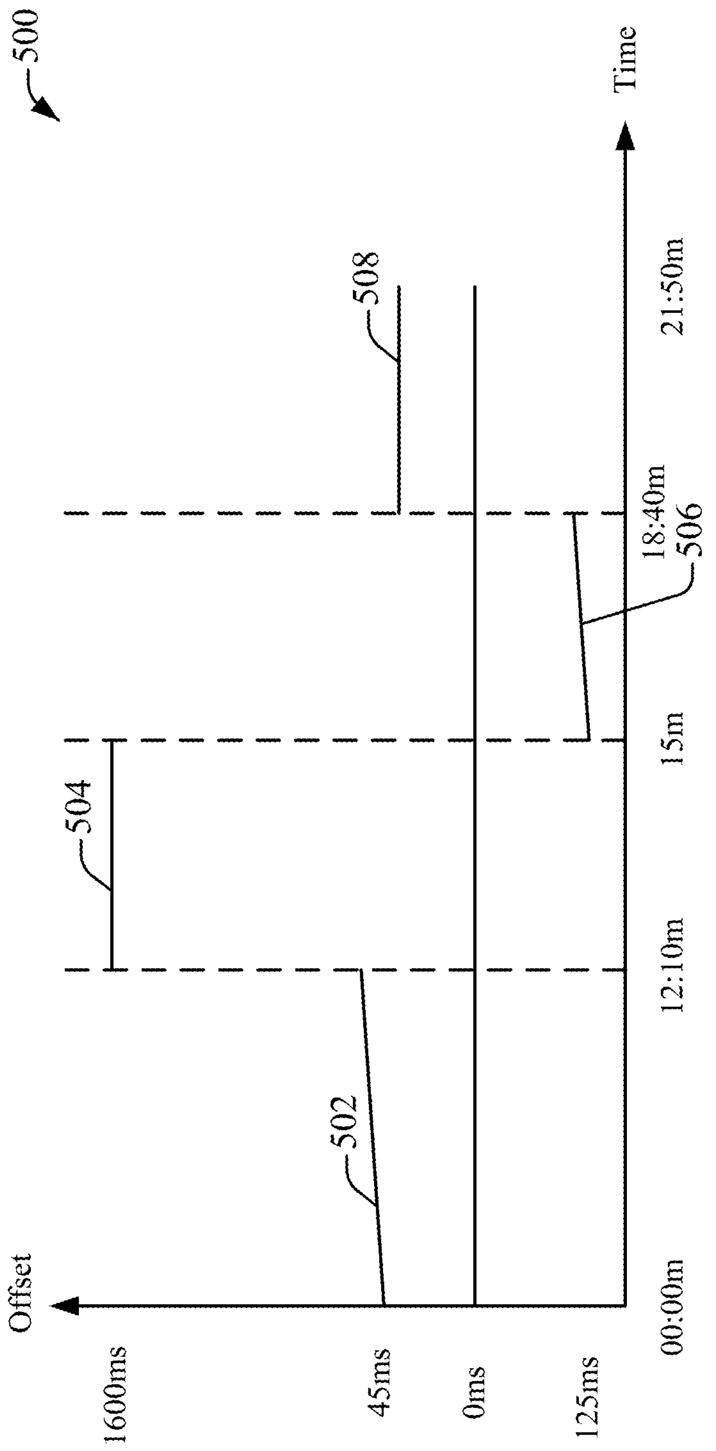
FIG. 5 depicts a graph of offsets that may be detected according to some embodiments.

Audio synchronization analyzer 108 may also detect intermittent offsets in the video. An intermittent offset may not be constant per video, but may occur intermittently within the video. Audio synchronization analyzer 108 evaluates samples to determine when an intermittent offset may occur, such as by using clustering to determine a cluster of offsets. FIG. 5 depicts a graph 500 of offsets that may be detected according to some embodiments. The Y axis is an offset value and the X axis is time in a timeline of a video. At 502, an offset of around +45 milliseconds is determined; at 504 an offset of around +1600 milliseconds is determined; at 506, an offset of around −125 milliseconds is determined; and then at 508, an offset of around +45 milliseconds is determined. Audio synchronization analyzer 108 may analyze one or more 10 ms samples or sequences to determine when intermittent offsets occur. Because offset analyzer 106 determined offsets for each sample or sequence in reference audio signal, audio synchronization analyzer 108 is able to determine intermittent offsets within the video. The offsets of the sequences (e.g., 10 s) may also be used to determine when intermittent offsets occur.

Sequences that contain only dialogue may be generally the most different in target audio signals. This is in contrast to portions of audio that only contain background cues where many similarities may be present. This may be because the background cues may not be subject to dubbing. Audio synchronization analyzer 108 may optimally detect offsets for background cues and speech. Prediction network 103 may be trained to output representations for background effects and speech that enable detections of offsets in both situations in a video.

Synchronization system 102 is also robust to potential audio differences in target audio signals. There may be different augmentations in a video, such as mixing with background laughter, the addition of Gaussian noise, random loudness gain, high pass filtering, low pass filtering, polarity inversion, and pitch shift. Prediction network 103 may be trained with these augmentations to generate representations between audios that may contain slight differences.

The offsets due to the representations may be found by audio synchronization analyzer 108 to detect the issues.

Audio synchronization analyzer 108 can also detect actual production errors, such as when lines of dialogue are not present in the target audio signal. Prediction network 103 may be trained to generate representations that detect these errors.

Accordingly, prediction network 103 may be trained to generate representations to detect different causes of offsets. This makes prediction network 103 robust when different offsets are caused by different issues in the same video. For example, the timing of laughter in a laugh track may not be the same in a target audio signal. Audio synchronization analyzer 108 may detect this offset in addition to other intermittent offsets due to other causes.

Conclusion

Accordingly, synchronization system 102 provides robust offset prediction that does not rely on similarity assumptions. Synchronization system 102 can detect different types of offsets that are caused by different types of causes. This results in an improvement of the process of detecting offsets.

System

Figure 6:
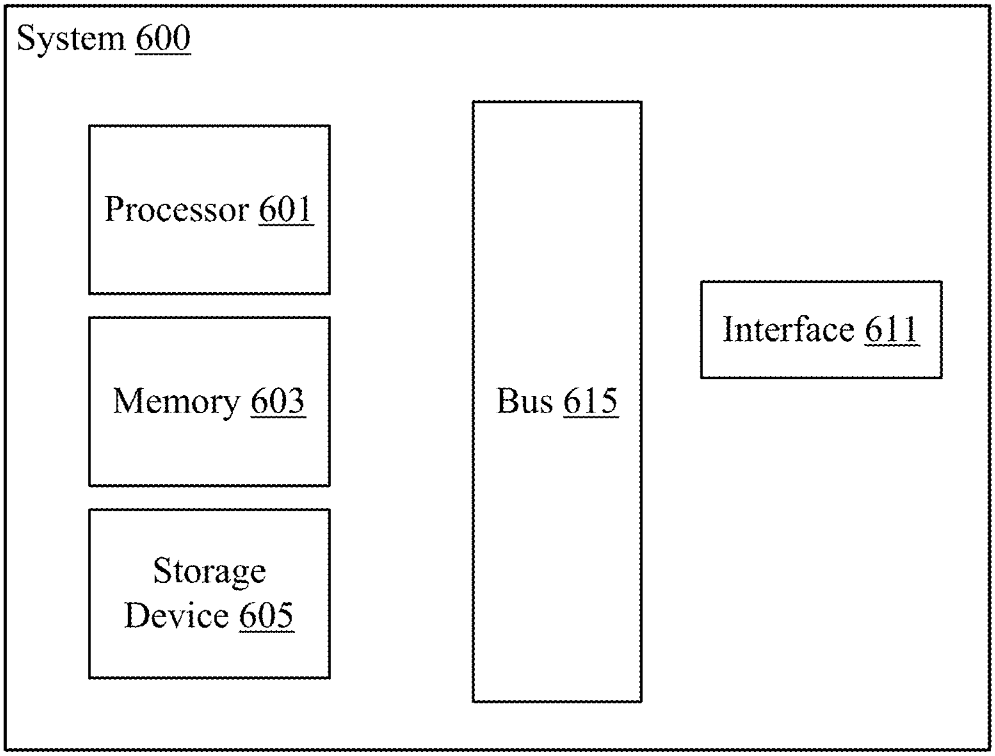
FIG. 6 illustrates one example of a computing device according to some embodiments.

FIG. 6 illustrates one example of a computing device according to some embodiments. According to various embodiments, a system 600 suitable for implementing embodiments described herein includes a processor 601, a memory 603, a storage device 605, an interface 611, and a bus 615 (e.g., a PCI bus or other interconnection fabric). System 600 may operate as a variety of devices, such any device or service described herein. Although a particular configuration is described, a variety of alternative configurations are possible. The processor 601 may perform operations such as those described herein. Instructions for performing such operations may be embodied in the memory 603, on one or more non-transitory computer readable media, or on some other storage device. Various specially configured devices can also be used in place of or in addition to the processor 601. Memory 603 may be random access memory (RAM) or other dynamic storage devices. Storage device 605 may include a non-transitory computer-readable storage medium holding information, instructions, or some combination thereof, for example instructions that when executed by the processor 601, cause processor 601 to be configured or operable to perform one or more operations of a method as described herein. Bus 615 or other communication components may support communication of information within system 600. The interface 611 may be connected to bus 615 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:

analyzing a first sample of a first audio signal to determine a first representation in a space;

analyzing a plurality of second samples for a second audio signal to determine a plurality of second representations in the space, wherein the first audio signal is a reference audio signal in an original language of a video and the second audio signal is a dubbed audio signal in a translation of the original language for the video, and wherein the first representation and the plurality of second representations are generated by a model trained to recognize offset issues in a dubbing process;

comparing distances in the space between the first representation and the plurality of second representations in the space to select a second representation;

determining an offset between the first sample in the first audio signal and a second sample in the second audio signal that is associated with the second representation; and outputting the offset.

2. The method of claim 1, wherein analyzing the first sample and analyzing the plurality of second samples comprises:

analyzing the first sample using a first branch of the model; and analyzing the plurality of second samples using a second branch of the model.

3. The method of claim 2, wherein:

the first branch and the second branch include the same logic to generate first representations and second representations, respectively, in the space.

4. The method of claim 3, wherein:

the first branch comprises first parameters that are trained to generate first representations, and the second branch comprises second parameters that are trained to generate second representations.

5. The method of claim 1, further comprising:

selecting a time period based on the first sample; and selecting the plurality of second samples based on the time period.

6. The method of claim 1, wherein comparing the first representation and the plurality of second representations comprises:

comparing a distance in the space between the first representation and second representation in the plurality of second representations; and selecting second representation from the plurality of second representations based on the respective distance.

7. The method of claim 6, wherein selecting second sample comprises:

selecting the second representation from the plurality of second representations based on the second representation having a minimum distance to the first representation in the space.

8. The method of claim 1, wherein:

the first sample is from a first sequence of first samples in the first audio signal, and the second sample is from a second sequence of second samples in the second audio signal.

9. The method of claim 8, further comprising:

determining an offset for the first samples to a respective second sample; and determining an offset for the first sequence based on the offset for the first samples.

10. The method of claim 1, further comprising:

determining a training dataset including pairs of first training audio samples and second training audio samples;

analyzing the pairs using a model to output first training representations and second training representations; and adjusting parameters of the model based on labels associated with the pairs and a distance between respective first training representations and second training representations.

11. The method of claim 10, wherein adjusting the parameters comprises:

adjusting a parameter to cause the model to output a first training representation or a second training representation that is closer in distance in the space when the pair has a label indicating the first training audio sample and the second training audio sample are in-sync; and adjusting the parameter to cause the model to output the first training representation or the second training representation that is farther in distance in the space when the pair has a label indicating the first training audio sample and the second training audio sample are out-of-sync.

12. The method of claim 1, wherein determining the offset comprises:

determining a first position identifier for the first sample in the first audio signal;

determining a second position identifier for the second sample in the second audio signal; and determining the offset based on the first position identifier and the second position identifier.

13. The method of claim 1, wherein determining the offset comprises:

determining the offset for a first time for the first sample in the first audio signal and a second time for the second sample in the second audio signal as the offset.

14. The method of claim 1, wherein:

the comparing of the first representation and the plurality of second representations in the space is based on a distance in the space between the first representation and the plurality of second representations, and the offset is determined based on a difference in time between the first sample and the second sample in the first audio signal and the second audio signal.

15. The method of claim 1, further comprising:

analyzing the offset to adjust a synchronization of the first audio signal and the second audio signal.

16. The method of claim 1, further comprising:

analyzing the offset to identify a synchronization issue of the first audio signal and the second audio signal.

17. A non-transitory computer-readable storage medium having stored thereon computer executable instructions, which when executed by a computing device, cause the computing device to be operable for:

analyzing a first sample of a first audio signal to determine a first representation in a space;

analyzing a plurality of second samples for a second audio signal to determine a plurality of second representations in the space, wherein the first audio signal is a reference audio signal in an original language of a video and the second audio signal is a dubbed audio signal in a translation of the original language for the video, and wherein the first representation and the plurality of second representations are generated by a model trained to recognize offset issues in a dubbing process;

comparing the first representation and the plurality of second representations in the space to select a second representation;

determining an offset between the first sample and a second sample that is associated with the second representation; and outputting the offset.

18. The non-transitory computer-readable storage medium of claim 17, wherein analyzing the first sample and analyzing the plurality of second samples comprises:

analyzing the first sample using a first branch of the model; and analyzing the plurality of second samples using a second branch of the model.

19. An apparatus comprising:

one or more computer processors; and a computer-readable storage medium comprising instructions for controlling the one or more computer processors to be operable for:

analyzing a first sample of a first audio signal to determine a first representation in a space;

analyzing a plurality of second samples for a second audio signal to determine a plurality of second representations in the space, wherein the first audio signal is a reference audio signal in an original language of a video and the second audio signal is a dubbed audio signal in a translation of the original language for the video, and wherein the first representation and the plurality of second representations are generated by a model trained to recognize offset issues in a dubbing process;

comparing the first representation and the plurality of second representations in the space to select a second representation;

determining an offset between the first sample and a second sample that is associated with the second representation; and outputting the offset.

20. The non-transitory computer-readable storage medium of claim 17, further operable for:

determining a training dataset including pairs of first training audio samples and second training audio samples;

analyzing the pairs using a model to output first training representations and second training representations; and adjusting parameters of the model based on labels associated with the pairs and a distance between respective first training representations and second training representations.

* * * * *